Feb. 15, 1955

E. O. LUND 2,702,213

JOINT FOR ENDLESS TRACKS OR BELTS FOR VEHICLES

Filed July 18, 1951

ENDRE OLSEN LUND.
INVENTOR.

BY Haseltine, Lake & Co
AGENTS

Feb. 15, 1955     E. O. LUND     2,702,213
JOINT FOR ENDLESS TRACKS OR BELTS FOR VEHICLES
Filed July 18, 1951     2 Sheets-Sheet 2
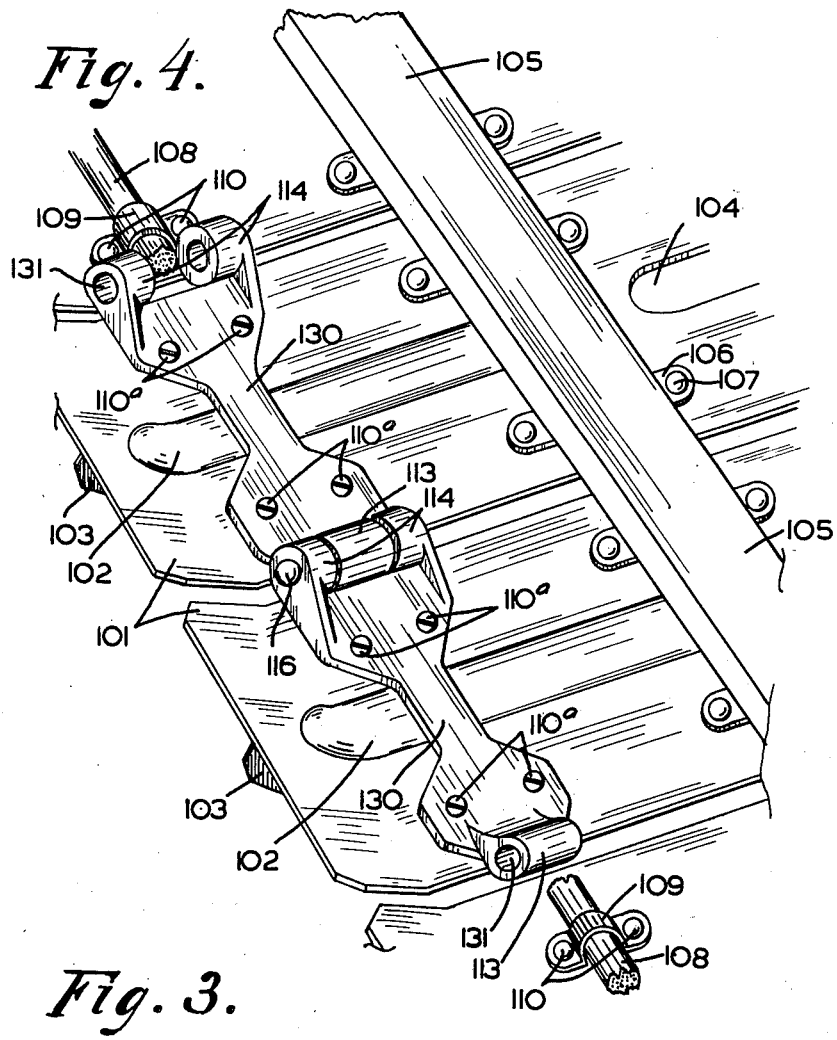
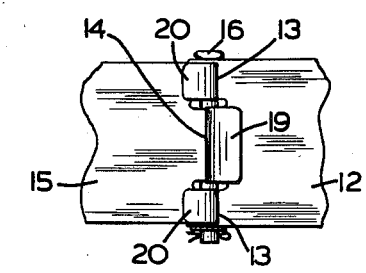
ENDRE OLSEN LUND.
INVENTOR.
BY Haseltine, Lake & Co.
AGENTS 2,702,213
Patented Feb. 15, 1955

2,702,213

JOINT FOR ENDLESS TRACKS OR BELTS FOR VEHICLES

Endre Olsen Lund, Eidfjord, Norway

Application July 18, 1951, Serial No. 237,385

Claims priority, application Norway December 14, 1950

2 Claims. (Cl. 305—10)

The present invention relates to improvements in joints for endless tracks or belts, particularly for those used on tracked vehicles.

The principal object of the invention is to provide a joint which may easily be used to repair such endless tracks or belts when a hinge member between two belt elements is broken or otherwise rendered useless. In a certain type of tracked vehicle, for example the so-called "Weasel-tank," the belt elements are joined together by endless longitudinal bands comprising metal wires having a resilient coating of rubber or like composition. These bands are provided with projecting lugs having holes corresponding to similar holes in the belt elements and are riveted thereto by rivets inserted through said holes in the lugs and the corresponding holes in the belt elements. Said bands thus serve as a hinge so that the belt elements may pivot in relation to each other. It is, however, common knowledge that these bands are the weakest part of this type of belt for tracked vehicles. If these bands are broken, the vehicle in question is rendered useless. It is common practice in such an emergency to repair the broken band or bands between two adjacent belt elements by a suitable length of a balata belting, which is riveted to both belt elements adjacent the broken joint.

Such repair is relatively complicated in that tools must be used first to drill holes in the belt elements and second to draw the belt elements together, and such repairs therefore have to be undertaken in a repair shop suitably equipped with tools, and cannot be undertaken if the break-down occurs in places remote from any repair shop facilities.

A further object of the present invention is to provide a joint for this type of belt, which joint may be used for repairs, when one or more bands are broken, and which repairs may easily be undertaken far away from repair shops.

My invention therefore consists of a joint for use between adjacent belt elements comprising a plate member attached to each belt element, each plate member having a projecting hinge lug or lugs cooperating with a corresponding lug or lugs on the plate member of the adjacent belt element, a hinge pin being inserted through said hinge lugs parallel to the adjacent edges of the two adjacent belt elements, so that these may pivot in relation to each other.

According to one embodiment of my invention each plate member may be divided into separate parts, each part being provided with members by which they are fastened to the belt elements and with means by which such parts may be drawn and held together, so that said fastening members are tightened on said belt elements. This embodiment is particularly adapted for emergency repairs. The only tool being necessary is a conventional pair of pliers or like hand tool which is to be found in the tool box of any vehicle. This type of joint may be used as an emergency repair for most types of belts for tracked vehicles, and not solely the type of belt described hereinabove.

According to another embodiment of my invention such plate members may be undivided and have projecting hinge lugs in both ends to cooperate with such hinge lugs on a plate member of the adjacent belt element. According to this embodiment the plate members are fastened to the belt elements by welding or riveting thereto. This embodiment is particularly adapted for more permanent repairs, but whereas it may be used for repairing most types of belts when welded to the belt elements, it can be used for repairing only the type of belt described hereinabove if riveted to the belt elements.

It will however be understood that the joints of both embodiments are equally good, the only difference being that in one case the repair may be made with a few hand tools, whereas in the other case the repair will have to be made with more complicated means.

Endless tracks or belts for tracked vehicles are known wherein each element of said belt has integrally formed therewith projecting hinge parts or lugs, which cooperate with corresponding hinge parts or lugs formed integral with the adjacent belt element and which pivot on a hinge pin. As will, however, be understood from the foregoing my invention does not relate to such joints, but exclusively to joints which may be attached to and between the belt elements after their usual joints, which in a particular case happen to be the endless bands, are broken and the belt and vehicle in question thus rendered useless for service.

Further characteristic features and objects of the invention are revealed in the following specification and claims.

Both the above mentioned embodiments are shown more clearly upon the annexed drawings, wherein:

Fig. 3 shows a part of the joint shown in Figs. 1 and 2 seen from the underside.

Fig. 4 shows a perspective view of a part of a track or belt for a tracked vehicle of the type described hereinabove and upon which an endless band has been broken, the broken joint being repaired by a joint according to the second embodiment of the invention.

Figure 1:
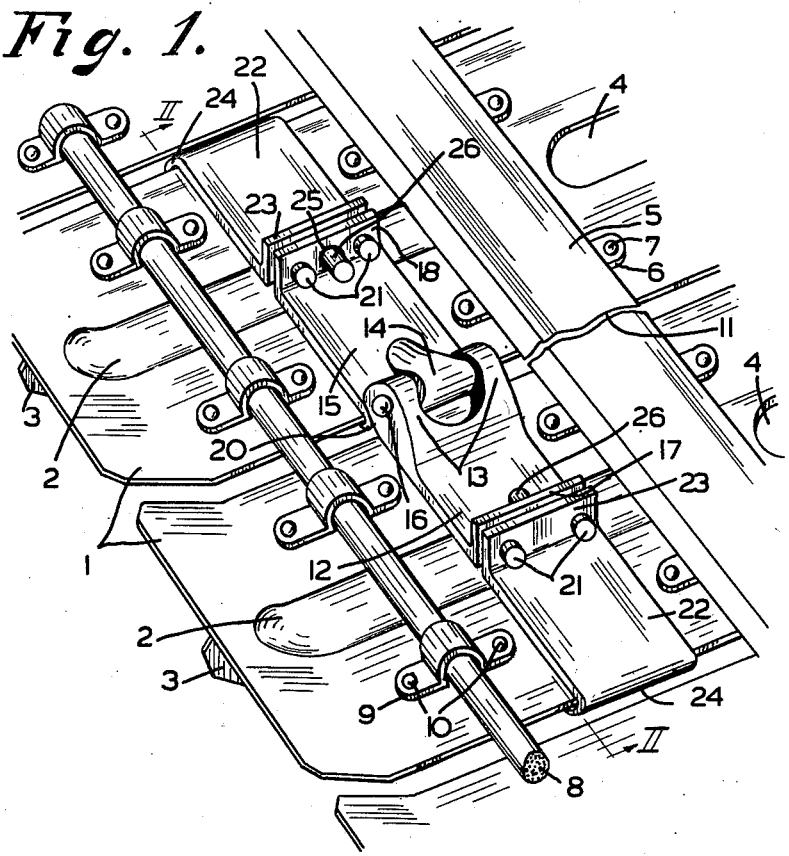
Fig. 1 shows a perspective view of a part of a track or belt for a tracked vehicle of the type described hereinabove and upon which an endless band has been broken, the broken joint being repaired by a joint according to one embodiment of the invention.
Figure 2:
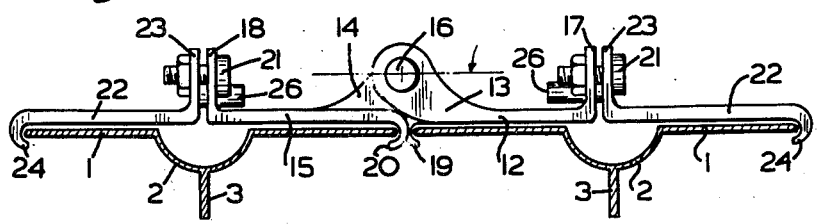
Fig. 2 shows a section along the line II—II on Fig. 1.

In the embodiment shown in Figs. 1, 2 and 3 of the annexed drawings the reference numeral 1 indicates the belt elements which form the belt. For the sake of simplicity only one half of these elements have been shown, but it will be understood that they have a rectangular form, the longest side being arranged transversely to the length of the belt (its direction of travel). Each belt element has impressed therein a rib 2 with a cleat or flange member 3 so that the belt may obtain a good grip in the surface upon which the vehicle travels. The belt is driven by wheels (not shown) in the conventional manner, the sprockets of said wheels engaging apertures 4 in the belt elements. In that type of belt described hereinabove, the belt elements are joined by thick endless bands 5, to which are vulcanized lugs 6 through which rivets 7 are riveted to the belt elements. The belt elements may further be joined by thinner endless bands 8 which by lugs 9 and rivets 10 are riveted to the belt elements. Along each side of the belt elements are one pair of such bands 5 and, if desired, 8, so that the belt elements may pivot in relation to each other in the usual manner when the vehicle drives over rough surfaces. The arrangement described in the foregoing are known features of belts used in certain types of tracked vehicles.

When band 5 is broken between two adjacent belt elements, as indicated by the reference numeral 11 in Fig. 1 of the drawings, these adjacent belt elements may be easily joined by the joints shown in the drawings and explained more fully in the following.

According to the embodiment shown in Figures 1–3 of the drawings the joint according to the invention consists of two parts. The first part is a plate or rectangular member 12, which along one side has at least two projecting lugs 13 between which is fitted a similar lug 14 of a second plate or rectangular member 15. The member 15 corresponds to the plate member 12 and through the lugs 13 and 14 respectively of both members there is a hinge pin 16 on which said members pivot. Further, each such member 12 and 15, at the ends remote from the lugs 13 and 15, is provided with a flanged part 17 and 18 disposed transversally across the length of said plate members. The adjoining ends of said plate members 12 and 15, on the face opposite the lugs 13 and 14, are provided with hook members 19 and 20, adapted to engage the adjacent edges of two adjoining belt elements as shown more clearly in Figure 2 of the drawings. Each flanged part 17 and 18 has holes adapted to receive tightening bolts 21.

The other part of the joint also consists of a plate member 22 having a flanged part 23 corresponding to the flanged members 17 and 18 of the first named plate members 12 and 15. This part 23 also has holes for receiving the bolts 21, in such a manner that both hinge members 12, 22 or 15, 22 may be joined together. The edge of the plate member 22 opposite the flanged part 23 has a hook member 24, corresponding to the hook members 19 and 20. When the hinge members are placed together as shown in Fig. 2 and when the bolts 21 have not been tightened, the distance between the hooks 19, 24 and 20, 24 respectively should be slightly more than the width of the belt elements 1 so that when the bolts 21 are tightened the hooks 19, 24 and 20, 24 are drawn together from both sides and fasten the hinge parts securely to said belt elements.

The plate members 22, 23, 24 in the two parts of a complete hinge, are identical and may thus be interchanged. Of course the lugs 13 and 14 upon the plate members 12 and 15 may be formed in such a manner also to make both these parts identical so that they also may be interchangeable.

Further the flanged parts 17 and 18 on each of the plate members 12 and 15 may be provided with a hole 25 through which to accommodate a pin 26 on the adjacent flanged part 23 of the other plate member 22. This pin-and-hole connection between the two adjacent plate members 12, 22 or 15, 22 of each pair forming a hinge member, is for easily locating the parts in relation to each other when assembling the parts and further to make the joint more rigid at this place and more adapted to withstand stresses at this joint.

When the extending hinge lug 14 on the hinge member 15 is inserted between the extending hinge lugs 13 on the other hinge member 12, the hinge pin 16 may be inserted in its appropriate holes in said lugs. This pin should have adequate clearance in such holes. It is sufficient to place the joint according to the invention between those two belt elements 1 between which the band 5 has been broken at 11, because the unbroken band 8 and the unbroken part of the band 5 will join the other belt elements together. If one or both bands are broken at other places, such joints as are herein described are placed between the belt elements adjacent the broken band. It will be understood that such repair can be undertaken everywhere without any other tools than those which are usually found in the tool chest of any vehicle.

In Figure 3, illustrating the underside of a hinge connection which contacts the belt, it will be seen that the adjoining ends of two plate elements are formed with hooks 19 and 20, one member in the example shown having a single hook 19 between two lugs 13, and the other a hook 20 on either side of the single lug 14.

In Figure 4 of the drawing there is shown another embodiment of the invention which may be used for a more permanent repair of a broken belt, or which may wholly or partly replace one or more of the four bands 5 and 8 joining the belt elements 1.

In Figure 4 the same reference numerals with an addition of 100 indicate the same constructive elements as in Figures 1, 2 and 3. However, the hook members 19, 24 and 20, 24, which engage the adjacent sides of the belt elements, are dispensed with and the two hinge members 12, 22 and 15, 22 are made as a single plate member 130, which has two projecting hinge lugs 113 at one end and a single central projecting hinge lug 114 at the other end. These lugs have a hole 131 for the hinge pin 116 which is located in alignment with the space between two adjacent belt elements.

The joint shown in Figure 4 may be attached to the belt elements 101 by the provision of fastening holes in the plate member 130 similarly spaced to the fastening holes for the rivets 110 (see 10, Figure 1) which hold the lugs 109 and the bands 108 to these belt elements. When the original rivets 110 have been removed the hinge elements 130 can be riveted direct to the belt elements 101, thus without further trouble using the existing holes to receive new rivets or screws 110a to hold the hinge elements 130, as shown in Figure 4. In the same manner the holes in the hinge elements 130 may be arranged to correspond to the holes for the rivets 107 which hold the bands 105. By using screws instead of rivets the holes may be threaded either in the belt elements or in the hinge elements to receive the threads of the screws, or these may have a head at one end and a lock nut at the other end to simplify the assembling. The hinge elements may also be fastened to the belt elements by being welded thereto. In both those cases where the existing rivet holes in the belt elements are to be used to hold the hinge elements, a part of the bands 105 and/or 108 must be removed and replaced by the hinge element in question, for example as shown in Figure 4 where a part of the band 108 has been replaced by a joint according to the invention.

An alternative is to leave the bands and place the hinge elements between the bands at the same place as shown in Figures 1 and 2. In that case either new fastening holes for the hinge elements 130 must be drilled in the belt elements or the former must be fastened to the latter by being welded thereto.

For both the embodiments described in the foregoing and shown in the drawings it is a condition that the hinge pin 16 or 116 should not be subjected to unforeseen and severe stresses, otherwise the joint will not act according to expectations. Therefore the center axis of the hinge pin 16 or 116 should be in alignment with the inner face of the band 5 or 105, that is to say the face which is seen in Figures 1 and 4 and which in Figure 2 is indicated by the chain line 5. Only if the hinge pin is so located will the joint turn freely around a wheel, because the adjacent edges of the belt elements are close together along the plane part of the track (between the wheels), but spread from each other when passing around the perimeter of a wheel. The center axis of the hinge pin 16 or 116 must therefore have such distance from the inner face of the belt elements that the spread of same when passing around the perimeter of a wheel, is exactly the same as previously when the belt elements in question are joined by the unbroken bands.

What is claimed is:

1. A connector for use in repairing an endless vehicle track having adjacent elements to be connected, said connector comprising two elongated flat plate members positioned against the inner faces of the adjacent elements of the track in end alignment, said plate members each including two end aligned parts, said plate members having hooks on the outer ends of their respective parts engaged about the edges of the respective elements of the track, flanges on the adjacent ends of the parts of each plate member formed with aligned holes, connector members inserted through said holes for drawing the parts of said plate members together with said hooks in position about the edges of the track elements, spaced lugs formed on the end portion of the part of one plate member facing the adjacent end of the other plate member, and a lug formed on the part of the other plate member facing the said end portion of said one plate member, said lugs being interdigitally arranged and pivotally connected together so that said plate members can move relative to one another.

2. A connector according to claim 1, wherein one flange of each plate member has an aperture, the other flange of each plate member has a pin extended toward the one flange and slidably received in said aperture to align said holes of the flanges to receive the connector members.

References Cited in the file of this patent

UNITED STATES PATENTS

| 1,437,736 | Neller | Dec. 5, 1922 |
| 1,634,337 | Panoch | July 5, 1927 |
| 1,702,223 | Snow, Jr. | Feb. 12, 1929 |
| 2,476,459 | Slemmons | July 19, 1949 |
| 2,495,962 | Gravelle et al. | Jan. 31, 1950 |

FOREIGN PATENTS

| 8,720 | Great Britain | Apr. 11, 1906 |